United States Patent [19]

Cuevas

[11] Patent Number: 5,558,367
[45] Date of Patent: Sep. 24, 1996

[54] DUAL STAGE AUGMENTED INFLATOR FOR AN AIR BAG

[75] Inventor: Jess A. Cuevas, Scottsdale, Ariz.

[73] Assignee: TRW Inc., Lyndhurst, Ohio

[21] Appl. No.: 403,386

[22] Filed: Mar. 14, 1995

[51] Int. Cl.⁶ .................................................. B60R 21/26
[52] U.S. Cl. ........................ 280/737; 280/736; 280/741; 102/202.14; 222/5
[58] Field of Search ................................. 280/736, 737, 280/740, 741, 742; 102/530, 531, 200, 200.14; 222/3, 5; 422/164–167

[56] References Cited

U.S. PATENT DOCUMENTS

| | | | |
|---|---|---|---|
| 3,901,530 | 8/1975 | Radke | 280/741 |
| 4,018,457 | 4/1977 | Marlow | 280/736 |
| 4,033,610 | 7/1977 | Shingu et al. | 280/737 |
| 4,981,534 | 1/1991 | Scheffe | 280/741 X |
| 5,016,914 | 5/1991 | Faigle et al. | 280/741 |
| 5,022,674 | 6/1991 | Frantom et al. | 280/741 |
| 5,078,422 | 1/1992 | Hamilton et al. | 280/736 |
| 5,273,312 | 12/1993 | Coultes et al. | 222/5 X |
| 5,348,344 | 9/1994 | Blumenthal et al. | 280/741 |
| 5,423,570 | 6/1995 | Kort et al. | 280/736 |

FOREIGN PATENT DOCUMENTS 3021042  10/1993  WIPO ..................... 280/736

*Primary Examiner*—Christopher P. Ellis
*Attorney, Agent, or Firm*—Tarolli, Sundheim, Covell, Tummino & Szabo

[57] ABSTRACT

An inflator (20) for inflating a vehicle air bag (22) comprises a housing (42, 44) defining a toroidal chamber (46) containing an inflation fluid for inflating the air bag. The toroidal chamber (46) extends around a central axis (A) of the housing (42, 44). A rupturable closure member (102) is fixed to the housing (42, 44) for blocking fluid communication from the toroidal chamber (46) to the air bag (22) when the closure member (102) is in an unruptured condition. The closure member (102) is located along the central axis (A) of the housing (42, 44). A first actuatable initiator (142) is supported in the housing (42, 44). The first initiator (142), when actuated, effects the rupture of the closure member (102) to allow inflation fluid to flow from the toroidal chamber (46) to the air bag (22). A second initiator (182) is also supported in the housing (42, 44). An ignitable material (222) is ignited by the second initiator (182) to effect an increase in the temperature and pressure of the inflation fluid flowing from the toroidal chamber (46).

25 Claims, 2 Drawing Sheets

DUAL STAGE AUGMENTED INFLATOR FOR AN AIR BAG

BACKGROUND OF THE INVENTION

1. Technical Field

The present invention relates to an apparatus for inflating an inflatable vehicle occupant restraint, such as an air bag. In particular, the present invention relates to a dual stage inflator for inflating an air bag.

2. Description of the Prior Art

Augmented inflators (also known as hybrid inflators) for inflatable occupant restraint systems are known. One such known inflator is disclosed in U.S. Pat. No. 3,901,530 and includes a first chamber containing inflation fluid stored under pressure. The inflator also includes a central housing that has a mixing chamber and flow passages communicating the first chamber with the mixing chamber. The central housing includes a diffuser which directs inflation fluid from the mixing chamber to an inflatable vehicle occupant restraint, such as an air bag. A first gas barrier blocks the flow of the inflation fluid from the mixing chamber to the diffuser.

The central housing has a pyrotechnic material in a second chamber to produce a combustion gas upon ignition. The second chamber and pyrotechnic material are isolated from fluid communication with the mixing chamber by a second gas barrier. Upon ignition of the pyrotechnic material by a squib, the gas barriers rupture to provide heat to the inflation fluid as the inflation fluid flows into the air bag. In this inflator, both of the gas barriers rupture at approximately the same time. Therefore, the timing of the pressure increase of the inflation fluid in the air bag is fixed and cannot be varied to accommodate conditions within the vehicle that may change.

SUMMARY OF THE INVENTION

The present invention is directed to an inflator for a vehicle occupant restraint. The inflator is relatively compact and, therefore, is particularly suitable for use with a driver's side air bag mounted on a steering wheel. The timing of the inflation fluid pressure increase in the air bag from the inflator of the present invention can be controlled in accordance with certain variables for properly cushioning a vehicle occupant during an emergency situation. Such variables may include the vehicle occupant seating position or distance from the air bag.

The inflator of the present invention comprises a housing defining a closed toroidal chamber containing inflation fluid for inflating the air bag. The toroidal chamber extends around a central axis of the housing. A first actuatable initiator is supported in the housing. The first initiator, when actuated, effects the opening of the closed toroidal chamber to enable inflation fluid to flow from the toroidal chamber to the air bag. A second initiator is supported in the housing. The second initiator, when actuated, ignites an ignitable material. Combustion products from the ignitable material mix with and heat the inflation fluid in the toroidal chamber. Thus, when actuated, the second initiator effects an increase in the temperature and pressure of the inflation fluid.

The first and second initiators extend in a direction substantially parallel to the central axis of the housing. The ignitable material extends in a direction transverse to the extent of the first and second initiators. The ignitable material is located at least partially within the axial extent of the first and second initiators to provide a relatively compact inflator. The first initiator is actuated and then said second initiator is actuated. A controller establishes a time delay between actuating the first and second initiators as a function of at least one sensed condition.

The inflator, according to one specific construction, comprises a first housing and a second housing fixed to the first housing to define a chamber for an inflation fluid. A flow passage extends through one of the first and second housings for conducting inflation fluid flow between the chamber and an air bag. A rupturable closure member is fixed to one of the first and second housings for blocking inflation fluid flow through the flow passage when the closure member is in an unruptured condition. A first actuatable initiator is supported in the second housing. The first initiator effects the rupture of the closure member, upon actuation, to enable inflation fluid flow through the passage. A second actuatable initiator is also supported in the second housing. An ignitable material effects an increase in the temperature and pressure of the inflation fluid in the chamber in response to actuation of the second initiator. The ignitable material is located in a passage extending between the second initiator and the chamber. A cap retains the ignitable material in the passage prior to ignition of the ignitable material. The ignitable material extends transverse to the extent of the first and second initiators.

The housings define a substantially toroidal shaped chamber containing the inflation fluid. The toroidal shaped chamber extends around a central axis of the housing. A diffuser is fixed to the second housing for directing the flow of inflation fluid into the air bag. The closure member is located between the first initiator and the diffuser. A movable member is located between the closure member and the first initiator for rupturing the closure member in response to actuation of the first initiator. The movable member preferably comprises a spherical member located in a rupture chamber extending between the first initiator and the closure member. A rupturable membrane retains the movable member in the rupture chamber prior to actuation of the first initiator.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
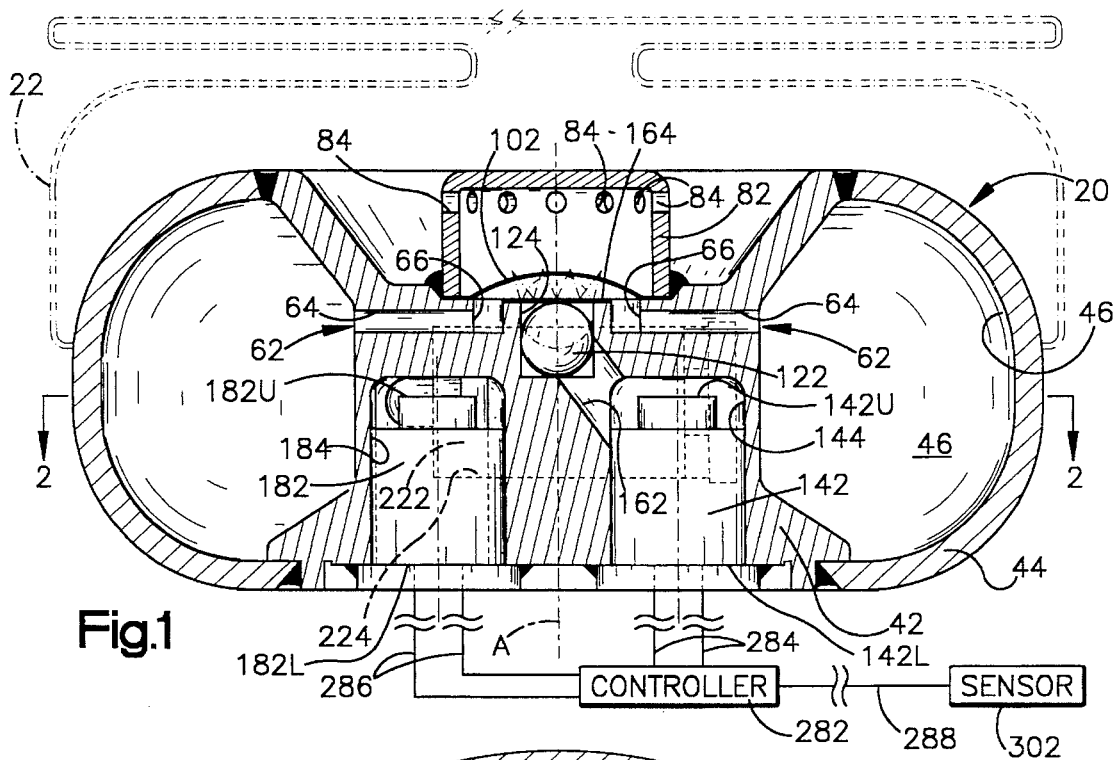
FIG. 1 is a schematic view including a cross-sectional illustration of an inflator embodying the present invention.
Figure 2:
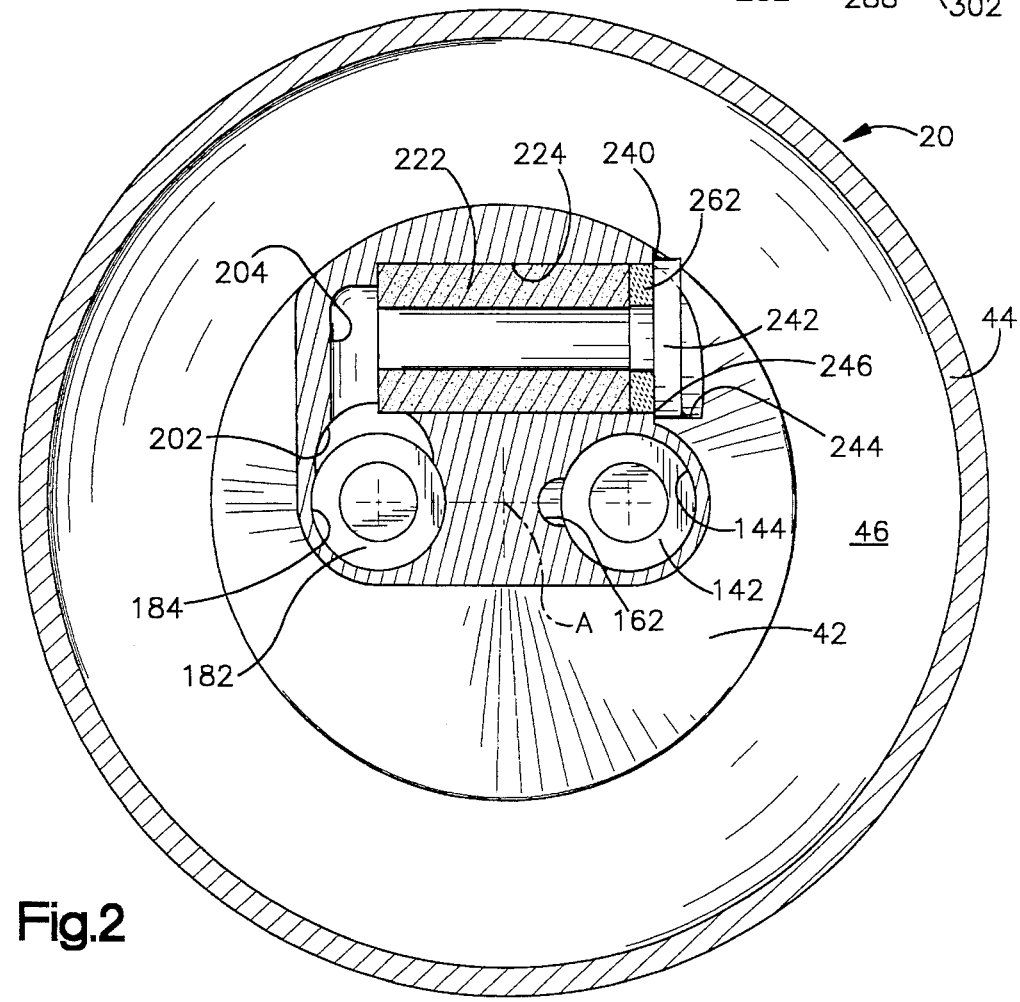
FIG. 2 is a cross-sectional view of the inflator of FIG. 1, taken approximately along line 2—2 in FIG. 1.

An inflator 20 is illustrated in FIGS. 1 and 2 for use in an inflatable vehicle occupant restraint system. The inflator 20 is actuatable to inflate an inflatable member, such as an air bag 22. The air bag 22 is operably connected with the inflator 20 and is illustrated in FIG. 1 in a stored or uninflated condition.

The inflator 20 is a dual stage type of inflator. The inflator 20 is particularly suitable for use in a driver's side inflatable occupant restraint system that is attachable to a steering wheel (not shown) of a vehicle, such as a passenger car, light truck and the like.

The inflator 20 includes a central housing 42 (FIGS. 1 and 2) with a longitudinal central axis A. The inflator 20 also includes an outer housing 44 which radially surrounds and is fixed to the central housing 42 in a suitable manner such as by welding. When the central housing 42 and the outer housing 44 are fixed together, they define a substantially toroidal shaped chamber 46 for containing an inflation fluid. The toroidal chamber 46 extends around the axis A of the central housing 42. The inflation fluid preferably is a known substantially non-ignitable inert gas, such as argon, or a combination of non-ignitable inert gasses. The inflation fluid is stored within the toroidal chamber 46 at a pressure which is typically at least 2,000 psi.

The central housing 42 includes a plurality of flow passages 62. The flow passages 62 permit flow of the inflation fluid from the chamber 46 to a location outside of the central housing 42 to the air bag 22. Each flow passage 62 includes a radially extending portion 64 in communication with the chamber 46 and an axially extending portion 66 for conducting flow of the inflation fluid to the air bag 22.

A cylindrical diffuser 82 is fixed to an axial end surface of the central housing 42. The diffuser 82 is located along the axis A of the central housing 42. The diffuser 82 includes a plurality of circular passages 84 which direct the flow of inflation fluid into the air bag 22. The passages 84 are arranged in a circumferential array about the diffuser 82 to provide a substantially radial flow of the inflation fluid out of the diffuser. The flow of the inflation fluid, as indicated by the reference character D in FIG. 3., is then directed axially by a deflector surface 86 of the central housing 42. It will be apparent that the passages 84 can be of any suitable shape, size and arrangement for directing the inflation fluid in a desired pattern and location into the air bag 22.

A closure member 102 is fixed to the central housing 42 along the axis A at a location between the central housing and the diffuser 82. The closure member 102 is rupturable and acts to prevent or block the flow of inflation fluid between the chamber 46 and the air bag 22 when the closure member is in an unruptured condition. The closure member 102 may be scored or weakened, as is known in the art, in order to rupture easily in a predetermined manner. When the closure member 102 is ruptured, flow of the inflation fluid is permitted from the chamber 46 through the flow passages 62 to the diffuser 82 and ultimately to the air bag 22.

A first actuatable initiator 142 is located in an axially extending first initiator chamber 144 within the central housing 42. The first initiator 142 and the first initiator chamber 144 extend in a direction substantially parallel to the axis A and radially offset from the axis. Upon actuation, the first initiator 142 produces initiating combustion products which release into the first initiating chamber 144. A first initiating combustion products passage 162 extends at an angle between the first initiating chamber 144 and a rupture chamber 124 which is disposed along the axis A. The combustion products passage 162 communicates the combustion products under pressure from the first initiating chamber 144 to the rupture chamber 124.

Figure 3:
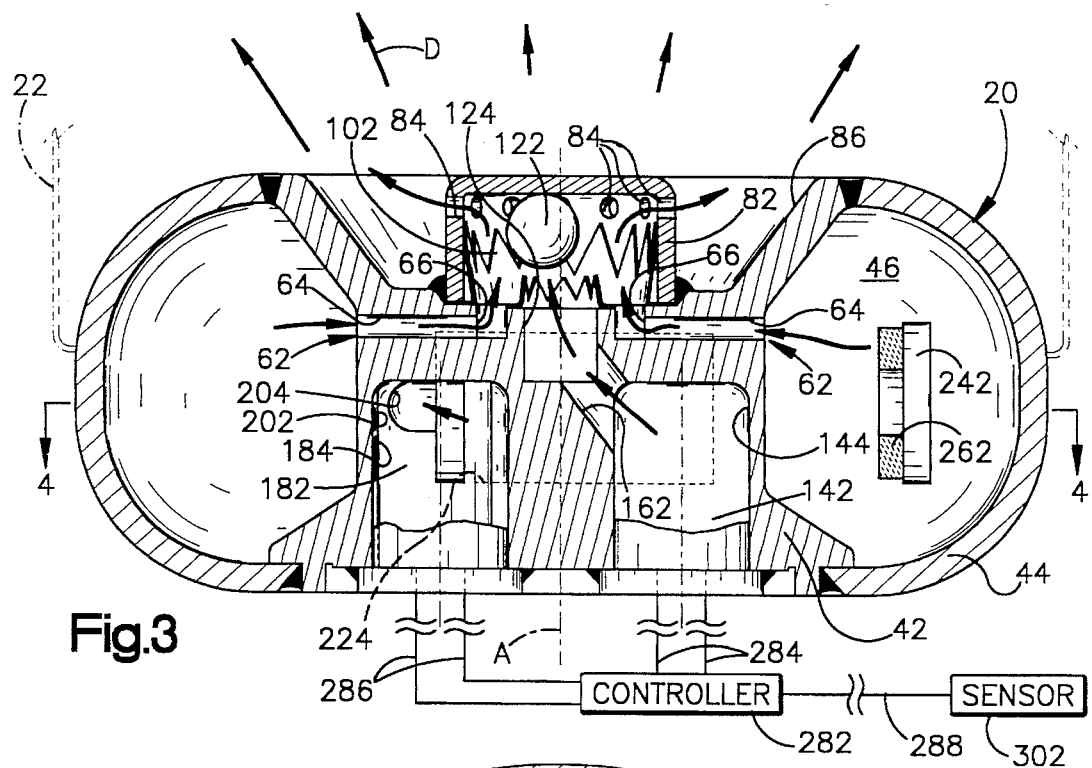
FIG. 3 is a schematic view similar to FIG. 1 with parts illustrated in different positions.

A spherical member 122 is located in the cylindrical rupture chamber 124. The spherical member 122 is movable within the rupture chamber 124 to a position, as illustrated in FIG. 3 in which the closure member 102 is ruptured by the spherical member 122. The spherical member 122 is preferably a stainless steel ball bearing.

The closure member 102 ruptures after being contacted and penetrated by the spherical member 122 which moves in response to pressure of the combustion products flowing into the rupture chamber 124. After the closure member 102 is ruptured, inflation fluid is free to flow from the chamber 46 through the flow passages 62 in the central housing 42 to the diffuser 82 and then into the air bag 22.

A rupturable membrane 164 is attached to the central housing 42 above the rupture chamber 124. The membrane 164 maintains the spherical member 122 within the rupture chamber 124 prior to actuation of the first initiator 142 to prevent unintended rupturing of the closure member 102 and to seal the chamber 46 from the rupture chamber and first initiator chamber 142. The membrane 164 is made from steel shim stock material approximately 0.002 inch thick. Upon movement of the spherical member 122 in the rupture chamber 124 from the position illustrated in solid line in FIG. 1 to the position illustrated in phantom line in FIG. 1 in response to actuation of the first initiator 142, the membrane 164 ruptures.

After the spherical member 122 ruptures the membrane 164, the spherical member moves to rupture the closure member 102. The spherical member 122 is then contained within the diffuser 82. The diameter of the spherical member 122 is selected so it does not interfere with the flow of the inflation fluid through the passages 84.

A second actuatable initiator 182 is located in a second initiator chamber 184 in the central housing 42. The second initiator 182 and the second initiator chamber 184 extend in a direction substantially parallel to the axis A and radially offset from the axis. The second initiator 182 is similar in structure and operation to the first initiator 162. Upon actuation, the second initiator 82 produces combustion products which are released into the second initiator chamber 184.

The second initiator chamber 184 is in fluid communication with a passage portion 202 radially offset from and extending in a direction substantially parallel to the second initiator chamber. The axially extending passage portion 202 is in fluid communication with a transversely extending passage portion 204.

A ignitable material 222 is located in a passage 224. The transversely extending passage portion 204 is in fluid communication with the material 222 and the passage 224. The ignitable material 222 and the passage 224 are transversely spaced from the first initiator 142 and the second initiator 182, as illustrated in FIG. 2. As illustrated in FIG. 1 in dashed lines, the material 222 and ignitable passage 224 are located axially at least partially within the axial extent of the first and second initiators 142, 182 defined by axial upper and lower ends 142U, 142L, 182U and 182L of the respective initiators. The ignitable passage 224 may communicate with the toroidal chamber 46.

A cap 242 is located in an end portion 244 of the ignitable material passage 224 to retain the ignitable material 222 within the passage and to seal the chamber 46 from the passage. The cap 242 blocks fluid communication between the toroidal chamber 46 and the passage 224 prior to ignition of the ignitable material 222. The cap 242 is preferably welded to the housing 42 by a relatively thin weld bead 240. It will be apparent that other suitable means for fixing the cap 242 in the passage 224 can be used as long as the passage is sealed from the chamber 46. A thermal isolation member 262 made of a ceramic material is provided between the cap 242 and the ignitable material 222 to isolate the ignitable material thermally from the cap during the welding operation which attaches the cap 242 to the housing 42.

Figure 4:
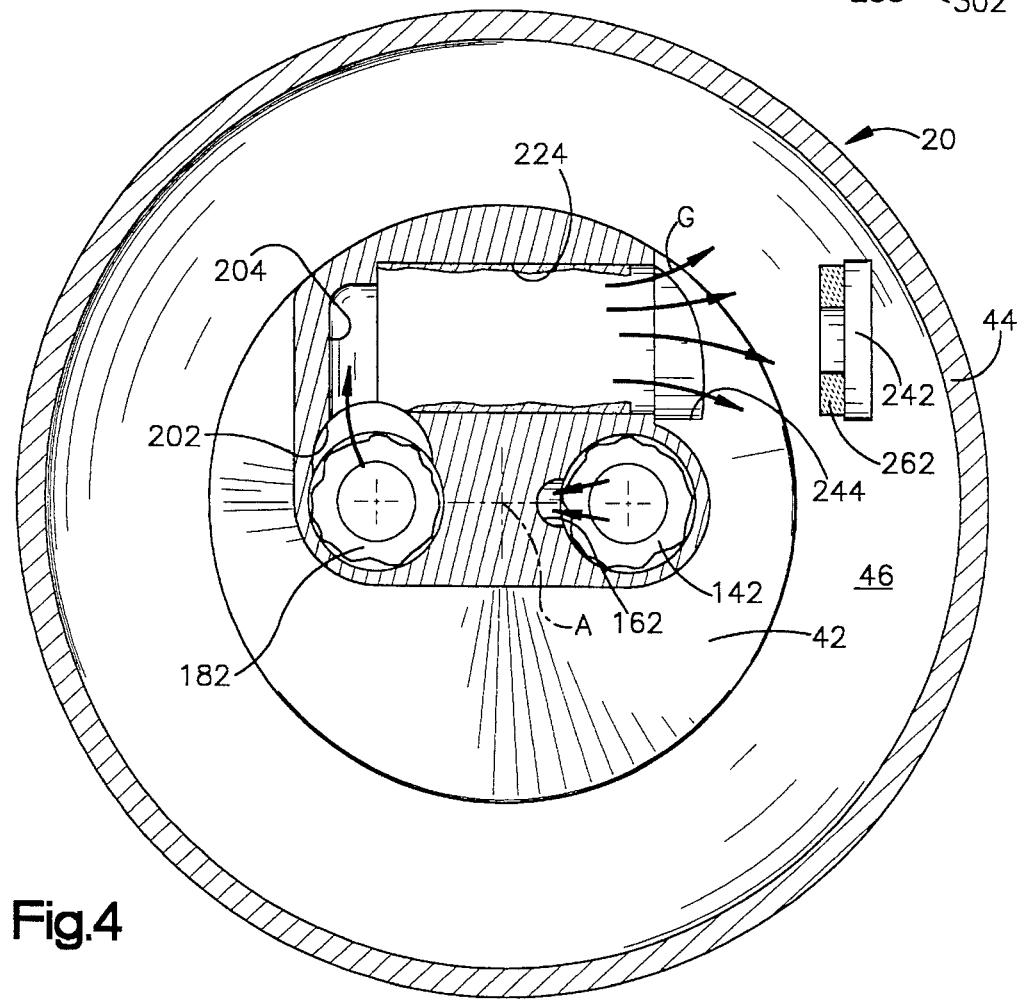
FIG. 4 is a view of the inflator similar to FIG. 2, taken approximately along line 4—4 in FIG. 3, with parts illustrated in different positions.

The cap 242 withstands the relatively high pressure of the inflation fluid in the chamber 46 by engaging a strong and rigid annular end surface 246 of the ignitable passage 224 in the housing 42. Thus, flow of the inflation fluid from the chamber 46 to the ignitable passage 224 is blocked by the strength of the cap 242 to resist bending or breaking due to the fluid pressure while the cap engages the annular end surface 246. The weld bead 240 has relatively little strength to resist movement of the cap 242 out of the end portion 244 of the ignitable passage 224. Therefore, when pressure within the ignitable passage 224 reaches a predetermined level which is slightly greater than the pressure in the chamber 46, the cap 242 breaks the weld bead 240. The cap 242 is then propelled into the chamber, as illustrated in FIGS. 3 and 4.

The material 222 ignites when contacted by the heated combustion products that are conducted through the passage portions 202, 204 from the second initiator 182. The ignitable material 222 ignites to produce combustion products in the passage 224. The combustion products are labeled with the reference character G in FIG. 4. When the pressure in passage 224 reaches the predetermined level, the cap 242 breaks away from the passage in the central housing 42, and the combustion products G are directed into the inflation fluid in the chamber 46. The combustion products G heat the inflation fluid in the chamber 46. Heating of the inflation fluid causes the pressure of the inflation fluid to increase as the inflation fluid flows toward the air bag 22.

The first initiator 142 is attached to a controller 282 by lead wires 284. The second initiator 182 is also connected to the controller 282 by lead wires 286. The controller 282 is in electrical communication with at least one sensor 302 over wire 288. As is known, the controller 282 is also in communication with a collision sensor (not shown). When the collision sensor communicates a signal to the controller 282 indicating that a collision has started, the controller triggers actuation of the first and second initiators 142, 182.

The controller 282 uses a signal from the sensor 302 to calculate if and how much of a time delay is to occur between actuation of the first initiator 142 and actuation of the second initiator 182. This time delay enables the inflator 20 to provide a tailored pressure profile over time of the inflation fluid being delivered to the air bag 22 dependent upon at least one of various factors, such as occupant weight, distance from the air bag, position or orientation on a vehicle seat, vehicle speed, severity of the crash, temperature within the passenger compartment and the like. Any or all of these factors can be used by the controller 282 to calculate the time delay for actuating the second initiator 182 after actuation of the first initiator 142. It will be apparent that more than one sensor 302 would be necessary if a plurality of factors were being used by the controller 282 to calculate the time delay.

In operation, the controller 282 has at least one signal communicated over the wire 288 from the sensor 302, which may be indicative of at least one factor upon the occurrence of a collision. Other conditions may be sensed and input to the controller 282. The controller 282 then calculates a time delay, if any, between actuation of the initiator 142 and the actuation of the second initiator 182.

The first initiator 142 is actuated to effect rupturing of the closure member 102 by forcing the spherical member 122 to move out of the rupture chamber 124. When the closure member 102 is ruptured, inflation fluid flows from the toroidal chamber 46 through the flow passages 62 and into the diffuser 82. The inflation fluid then exits the diffuser 82 through the passages 84 and is directed into the air bag 22 to inflate the air bag in a predetermined manner with a desired pressure profile over time.

Simultaneously with, or slightly after actuation of the first initiator 142, the second initiator 182 is actuated. The second initiator 182 is actuated to ignite the ignitable material 222 to separate the cap 242 from the passage 224. Combustion products G are released into the toroidal chamber 46 which heats and pressurizes the inflation fluid as it flows into the air bag 22. The time of actuation of the second initiator 182 may be controlled by controller 282 to control the pressure profile over time in the air bag 22.

From the above description one skilled in the art should appreciate that the overall axial extent of the inflator 20 is relatively small to provide a relatively short and compact inflator that is suitable for use with a driver's side air bag because it occupies minimum space within the steering wheel. However, the inflator 20 could be equally well adapted to other uses. Also from the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating an air bag, said apparatus comprising:

a first housing;

a second housing fixed to and surrounded by said first housing to define a chamber for an inflation fluid;

a flow passage extending through one of said first and second housings for conducting inflation fluid from the chamber to an air bag;

a rupturable closure member fixed to one of said first and second housings for blocking fluid communication through said flow passage when the closure member is in an unruptured condition;

first actuatable initiator means located in said second housing for effecting the rupture of said closure member, upon actuation, to enable fluid flow through said flow passage;

a second actuatable initiator located in said second housing; and an ignitable material for effecting an increase in the temperature and pressure of the inflation fluid in the chamber in response to actuation of said second initiator, said ignitable material located in a passage in said second housing and extending between said second initiator and the chamber.

2. The apparatus set forth in claim 1 further including means for actuating said first initiator means and then said second initiator.

3. The apparatus set forth in claim 1 wherein said second housing is radially surrounded by said first housing to define a substantially toroidal chamber for the inflation fluid.

4. The apparatus set forth in claim 1 wherein said second housing has a central axis and said first initiator means and said second initiator extend in a direction parallel to the central axis, and said ignitable material extends in a direction transverse relative to the direction in which said first initiator means and said second initiator extend.

5. The apparatus set forth in claim 4 wherein said ignitable material is transversely spaced from said first initiator means and said second initiator and is axially positioned at least partially between the axial ends of said first initiator means and said second initiator.

6. The apparatus set forth in claim 1 further including a diffuser fixed to said second housing for directing the flow of inflation fluid into the air bag.

7. The apparatus set forth in claim 6 wherein said closure member is located between said second initiator and said diffuser.

8. The apparatus set forth in claim 1 further including a movable member located between said closure member and said first initiator means for rupturing said closure member in response to actuation of said first initiator means.

9. The apparatus set forth in claim 8 wherein said movable member comprises a spherical member located in a rupture chamber that is in communication with a passage extending between said first initiator means and said rupture chamber.

10. The apparatus in claim 9 further including a rupturable membrane retaining said movable member in said rupture chamber prior to actuation of said first initiator means.

11. The apparatus set forth in claim 1 further including a cap retaining said ignitable material in the passage and sealing the passage from the chamber prior to ignition of said ignitable material, said cap being movable after ignition of said ignitable material to permit fluid communication between the passage and the chamber.

12. An apparatus for use in inflating an air bag, said apparatus comprising:

a first housing;

a second housing fixed to said first housing to define a chamber for containing an inflation fluid and having a flow passage permitting fluid flow between the chamber and an air bag;

a rupturable closure member fixed to said second housing for blocking fluid flow through the flow passage when said closure member is in an unruptured condition;

a first actuatable initiator supported in said second housing;

a second actuatable initiator supported in said second housing;

an ignitable material located in a passage in the second housing and extending between the chamber and said second initiator, said ignitable material igniting in response to actuation of said second initiator for effecting an increase in the temperature and pressure of the inflation fluid; and a movable member located between said closure member and said first initiator for rupturing said closure member in response to actuation of said first initiator to enable fluid flow through the flow passage.

13. The apparatus set forth in claim 12 wherein said second housing has a central axis and said first and second initiators extend in a direction substantially parallel to the central axis, said ignitable material extending in a direction transverse to said direction in which said first and second initiators extend.

14. The apparatus set forth in claim 13 wherein said ignitable material is transversely spaced from said first and second initiators and is axially positioned at least partially between the axial ends of said first and second initiators.

15. The apparatus set forth in claim 12 further including a diffuser fixed to said second housing for directing flow of inflation fluid into the air bag, said closure member being located between said diffuser and said second housing.

16. The apparatus set forth in claim 12 wherein said movable member comprises a spherical member located in a rupture chamber in communication with a flow passage extending between said rupture chamber and said first initiator.

17. The apparatus set forth in claim 12 further including means for actuating said first initiator and then said second initiator.

18. The apparatus set forth in claim 12 wherein said first and second housings cooperate to define a substantially toroidal chamber for the inflation fluid.

19. The apparatus set forth in claim 12 further including a cap retaining said ignitable material in the passage and sealing the passage from the chamber prior to ignition of said ignitable material, said cap being movable after ignition of said ignitable material to permit fluid communication between the passage and the chamber.

20. An apparatus for use in inflating an air bag, said apparatus comprising:

a housing including a central portion and an outer portion surrounding said central portion, said housing defining a toroidal chamber containing inflation fluid for inflating an air bag, said toroidal chamber extending around a central axis of said housing;

a rupturable closure member fixed to said housing for blocking fluid communication from the toroidal chamber to the air bag when said closure member is in an unruptured condition, said closure member being located on said central axis;

a first actuatable initiator located in said central portion of said housing, said first initiator, when actuated, effecting the rupture of said closure member to enable inflation fluid to flow from the toroidal chamber to the air bag;

a second actuatable initiator located in said central portion of said housing; and an ignitable material located in said central portion of said housing and ignited by actuation of said second initiator for effecting an increase in the temperature and pressure of the inflation fluid.

21. The apparatus set forth in claim 20 wherein said first and second initiators extend in a direction substantially parallel to the central axis, and said ignitable material being tubular and extends in a direction transverse to said direction in which said first and second initiators extend, said ignitable material being transversely spaced from said first and second initiators and axially positioned at least partially between the axial ends of said first and second initiators.

22. The apparatus set forth in claim 20 further including a diffuser fixed to said housing for directing the flow of inflation fluid into the air bag and wherein said closure member is located between said housing and said diffuser.

23. The apparatus set forth in claim 20 further including a movable member located between said closure member and said first initiator for rupturing said closure member in response to actuation of said first initiator.

24. The apparatus set forth in claim 20 further including means for actuating said first initiator and then said second initiator.

25. An apparatus for use in inflating an air bag, said apparatus comprising:

a housing defining a closed toroidal chamber containing inflation fluid for inflating an air bag, said toroidal shaped chamber extending around a central axis of said housing;

first actuatable initiator means supported in said housing for, when actuated, effecting the opening of said closed toroidal chamber to allow inflation fluid to flow from the toroidal chamber to the air bag;

second initiator means supported in said housing for, when actuated, effecting an increase in the temperature and pressure of the inflation fluid, said first and second initiator means extending in a direction substantially parallel to the central axis; and ignitable material located in a passage in said housing, the passage extending in a direction transverse to the central axis, said ignitable being transversely spaced from said first and second initiator means and axially positioned at least partially between the axial ends of said first and second initiator means.

* * * * *